United States Patent
Watanabe et al.

(10) Patent No.: US 9,868,392 B2
(45) Date of Patent: Jan. 16, 2018

(54) APPROACHING VEHICLE WARNING SPEAKER DEVICE

(71) Applicants: PIONEER CORPORATION, Tokyo (JP); Tohoku Pioneer Corporation, Yamagata (JP); ANDEN CO., LTD., Aichi (JP)

(72) Inventors: Kazuaki Watanabe, Yamagata (JP); Junichi Sato, Yamagata (JP); Susumu Miyata, Aichi (JP); Makoto Tsuruta, Aichi (JP)

(73) Assignees: PIONEER CORPORATION, Tokyo (JP); TOHOKU PIONEER CORPORATION, Yamagata (JP); ANDEN CO., LTD., Anjo (JP)

(*) Notice: Subject to any disclaimer, the term of this patent is extended or adjusted under 35 U.S.C. 154(b) by 0 days.

(21) Appl. No.: 15/129,258

(22) PCT Filed: Mar. 28, 2014

(86) PCT No.: PCT/JP2014/059365
§ 371 (c)(1),
(2) Date: Sep. 26, 2016

(87) PCT Pub. No.: WO2015/145777
PCT Pub. Date: Oct. 1, 2015

(65) Prior Publication Data
US 2017/0101053 A1 Apr. 13, 2017

(51) Int. Cl.
*H04R 9/04* (2006.01)
*B60Q 5/00* (2006.01)
*H04R 9/06* (2006.01)

(52) U.S. Cl.
CPC ............ *B60Q 5/008* (2013.01); *H04R 9/046* (2013.01); *H04R 9/06* (2013.01); *H04R 2499/13* (2013.01)

(58) Field of Classification Search
CPC ... H04R 9/04; H04R 1/02; H04R 9/02; H04R 2430/20; H04R 9/046; B06Q 5/008
(Continued)

(56) References Cited

U.S. PATENT DOCUMENTS 6,421,449 B1 * 7/2002 Hasegawa ............. H04R 9/046
381/401
8,045,746 B2 10/2011 Takayama et al.
(Continued)

FOREIGN PATENT DOCUMENTS

JP 06-325923 11/1994
JP 06325923 A * 11/1994
(Continued)

OTHER PUBLICATIONS

International Search Report, PCT/JP2014/059365, dated Apr. 28, 2014.

*Primary Examiner* — Melur Ramakrishnaiah
(74) *Attorney, Agent, or Firm* — Young & Thompson

(57) ABSTRACT

This approaching vehicle notification sound speaker device is equipped with a voice coil for conducting an electrical signal, a cylindrical voice coil bobbin on which the voice coil is wound, an insulating sheet, and a cap. The sheet is wound on the voice coil bobbin at a position closer to the sound-emitting side than the voice coil, the cap is disposed closer to the sound-emitting side than the voice coil bobbin, the voice coil bobbin and the cap are made of an aluminum-containing material, and the sheet is formed with the inclusion of an aramid-based nonwoven fabric.

14 Claims, 4 Drawing Sheets

(58) Field of Classification Search
USPC ................ 381/86, 401, 407, 410; 340/425.5
See application file for complete search history.

(56) References Cited

U.S. PATENT DOCUMENTS

| | | |
|---|---|---|
| 2007/0154057 A1 | 7/2007 | Takayama et al. |
| 2012/0182136 A1* | 7/2012 | Nakayama ............. B60Q 5/008 340/425.5 |
| 2013/0314224 A1 | 11/2013 | Nakayama et al. |

FOREIGN PATENT DOCUMENTS

| | | | | |
|---|---|---|---|---|
| JP | 07-298392 | | 11/1995 | |
| JP | 07298392 A | * | 11/1995 | ............. H04R 9/022 |
| JP | 11-18196 | | 1/1999 | |
| JP | 11018196 A | * | 1/1999 | |
| JP | 2002-271894 | | 9/2002 | |
| JP | 2002271894 A | * | 9/2002 | |
| JP | 2005-006140 | | 1/2005 | |
| JP | 2005006140 A | * | 1/2005 | |
| JP | 2007-174605 | | 7/2007 | |
| JP | 2007174605 A | * | 7/2007 | ............. H04R 9/045 |
| JP | 2010-187365 | | 8/2010 | |
| JP | 2010187365 A | * | 8/2010 | |
| JP | 2013-246351 | | 12/2013 | |
| JP | 2013246351 A | * | 12/2013 | ............... B60Q 5/00 |

* cited by examiner

APPROACHING VEHICLE WARNING SPEAKER DEVICE

TECHNICAL FIELD

The present invention relates to an approaching vehicle warning speaker device.

BACKGROUND ART

Pedestrians, such as a walking person, may not notice an approaching hybrid vehicle or an electric vehicle, which moves very quietly. Various types of approaching vehicle warning speaker devices are proposed to be mounted on a vehicle, such as a hybrid vehicle, to generate a warning sound to notice pedestrians of an approaching vehicle, such as a hybrid vehicle. Manufacturers independently determine specifications of such approaching vehicle warning speaker devices. So that, approaching vehicle warning speaker devices are not designed based on unified standards specifying, for example, thermal resistance or environmental resistance.

The trend in recent years has shown that the method of mounting the approaching vehicle warning speaker device and the specification of the approaching vehicle warning speaker device are to be legislated. Furthermore, the approaching vehicle warning speaker device, which is mounted near an engine or a motor in a hybrid vehicle or the like, is required to have environmental resistance, such as the reproduced sound pressure, thermal resistance, moisture resistance, and water resistance for each frequency band.

One of objects of the present invention is to raise the high reproduced sound pressure and to improve environmental resistance such as thermal resistance, moisture resistance, and water resistance.

SUMMARY OF INVENTION

Solution to Problem

An approaching vehicle warning speaker device according to present invention includes a voice coil conductive of electric signals, a sleeve-shaped voice coil bobbin around which the voice coil is wound, an insulating sheet, and a cap. The sheet is wrapped around the voice coil bobbin at a location further in the sound-emission side than the voice coil. The cap is provided further in the sound-emission side than the voice coil bobbin. The voice coil bobbin and the cap are made of material containing aluminum. The sheet includes non-woven fabric containing aramid.

DESCRIPTION OF EMBODIMENTS

Figure 1:
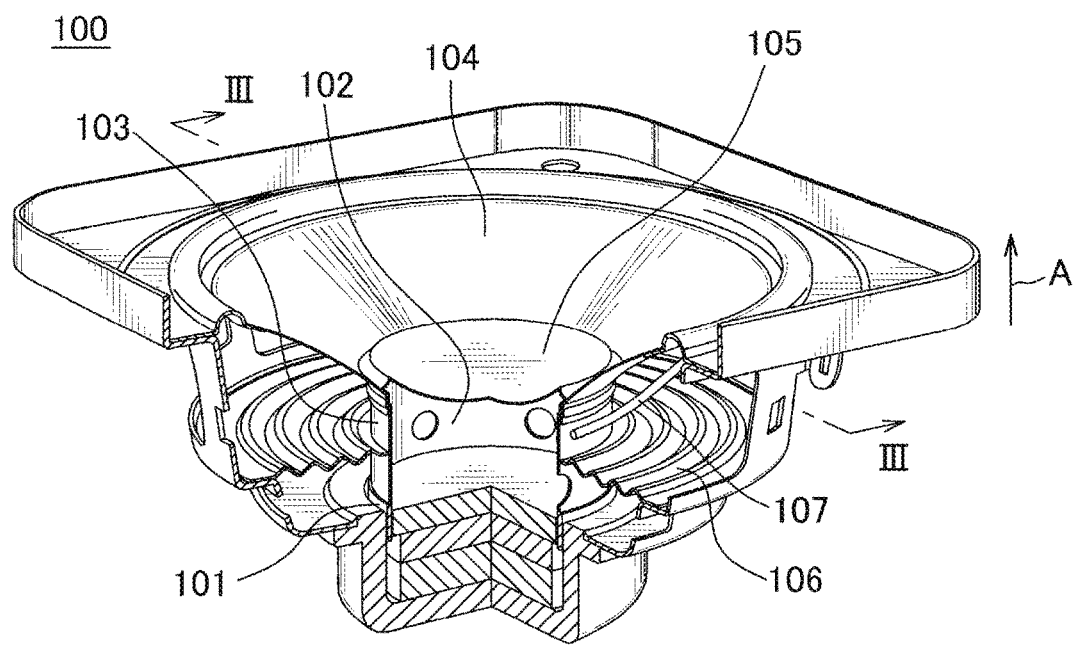
FIG. 1 is a perspective view illustrating an approaching vehicle warning speaker device according to a first embodiment of the present invention with a portion cut out to show a cross section.

An approaching vehicle warning speaker device according to one embodiment of the present invention will be described. The approaching vehicle warning speaker device according to one embodiment includes a voice coil conductive of electric signals, a sleeve-shaped voice coil bobbin around which the voice coil is wound, an insulating sheet, and a cap. The sheet is wrapped around the voice coil bobbin at a location further in the sound-emission side than the voice coil. The cap is provided further in the sound-emission side than the voice coil bobbin. The voice coil bobbin and the cap are made of material containing aluminum. The sheet includes non-woven fabric containing aramid.

The voice coil bobbin and the cap made of material containing aluminum offer preferable heat dissipating properties that improve thermal resistance. The components are made light in weight, providing high reproduced sound pressures.

The voice coil is preferably made of a covered wire coated with polyamide-imide or polyimide. The voice coil thus configured offers improved thermal resistance.

The thickness of the cap is preferably equal to or smaller than the thickness of the voice coil bobbin. The cap thus formed further reduces the weight of the approaching vehicle warning speaker device to improve the reproduced sound pressure.

The voice coil bobbin may have a thickness of 50 μm to 80 μm. Although a thinner voice coil bobbin is preferable, the voice coil bobbin thinner than 50 μm can hardly keep its initial shape when the temperature of the voice coil bobbin is high. Meanwhile, the voice coil bobbin thicker than 80 μm cannot offer a desired frequency characteristic because of its heavy weight.

The cap may have a thickness of 30 μm to 50 μm. Although a thinner cap is preferable, the cap thinner than 30 μm cannot offer sufficient strength. Meanwhile, the cap thicker than 50 μm cannot offer a desired frequency characteristic because of its heavy weight.

Preferably, a damper is bonded to the sheet in a manner encircling the sheet. The damper is more firmly bonded to the sheet than to the voice coil bobbin containing aluminum. This improves environmental resistance.

Preferably, the voice coil is joined to a tinsel wire, the tinsel wire is led out from the voice coil bobbin, at a location further in the sound-emission side than the damper, further in the sound-emission side toward the outer edge of the damper, the tinsel wire inflecting at an inflection point in the sound-emission side to be directed to the side opposite the sound-emission side, and the terminal of the tinsel wire is joined to the outer edge of the damper.

Configured in such a manner, the length of the portion of the tinsel wire running above the damper can be reduced. This reduces the force acting on the tinsel wire generated by vibration of the voice coil and thus reduces the force acting on a joint between the tinsel wire and the voice coil bobbin. Therefore, the volume of reinforcement (e.g., modified polyamide) applied to the joint between the tinsel wire and the voice coil can be minimized or eliminated.

The tinsel wire is preferably provided approximately line symmetric about the line extending from the inflection point along the sound-emission direction.

With the tinsel wire thus provided, the damage to the joint between the voice coil bobbin and the tinsel wire due to, for example, excessive load on the tinsel wire caused by resonation of the tinsel wire by vibration of the voice coil bobbin is suppressed, and thus the environmental resistance can be improved.

An adhesive bonds together the sheet and the damper. An adhesive containing one or more components selected from a group of acrylic resin, silicone resin, and epoxy resin can be used.

Preferably, a diaphragm that generates sound is provided, and the diaphragm is bonded to the sheet. In this configuration, the sheet comprising non-woven fabric made of aramid is provided between the voice coil bobbin and the diaphragm to bond together the voice coil bobbin and the diaphragm. The diaphragm and the voice coil bobbin containing aluminum are more firmly bonded together via the sheet than bonding the diaphragm directly to the voice coil bobbin. Thus, the shock resistance can be improved.

Preferably, the sheet and the diaphragm are bonded together using the adhesive, and an annular member is joined to the voice coil bobbin at a location further in the side opposite the sound-emission side than the diaphragm.

With such a configuration, the annular member dams the adhesive that bonds the diaphragm, so that the adhesive will not spread beyond the area to be bonded. This reduces the amount of the adhesive that is used. Therefore, the approaching vehicle warning speaker device can be made light in weight, thereby raising the reproduced sound pressure.

EMBODIMENTS

Embodiments of an approaching vehicle warning speaker device according to the present invention will now be described with reference to FIGS. 1 to 5.

First Embodiment

Figure 2:
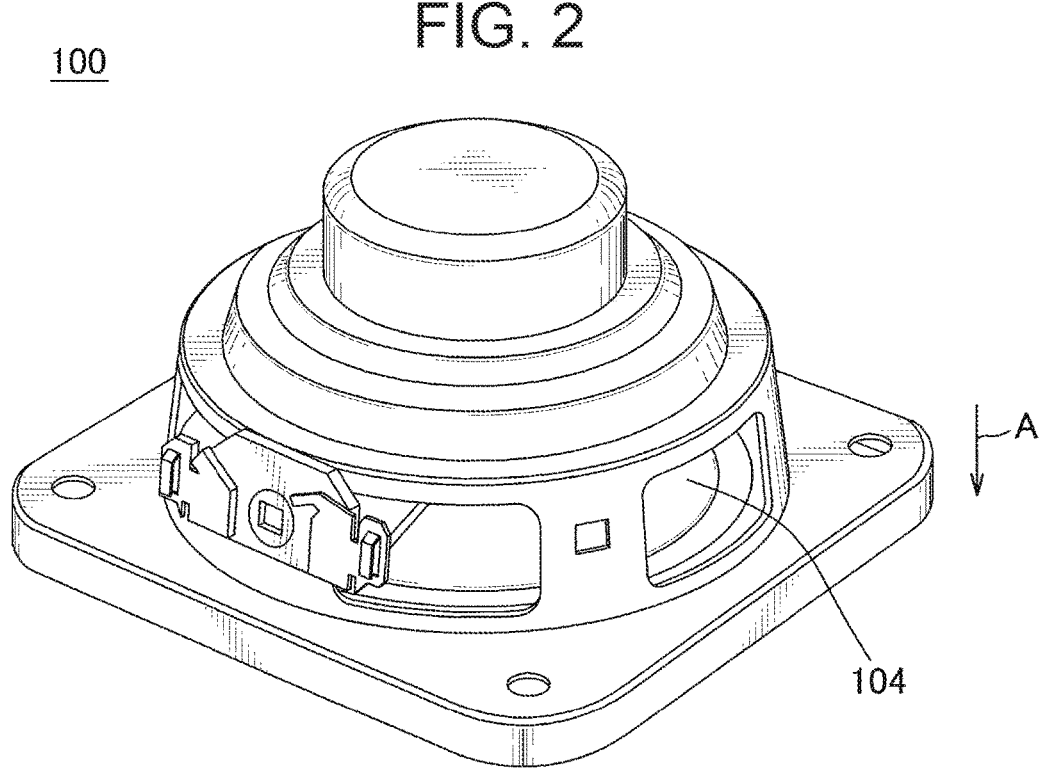
FIG. 2 is a perspective view illustrating the approaching vehicle warning speaker device in FIG. 1 viewed from the opposite side.

An approaching vehicle warning speaker device 100 according to a first embodiment of the present invention will now be described with reference to FIGS. 1 to 4. The approaching vehicle warning speaker device 100 according to the first embodiments is used as, for example, an approaching vehicle warning speaker device mounted on a hybrid vehicle. FIG. 1 is a perspective view illustrating the approaching vehicle warning speaker device 100 with a portion cutout. FIG. 2 is a perspective view of the approaching vehicle warning speaker device 100 in FIG. 1 viewing from the opposite side. In FIG. 1, sound is emitted in the direction indicated by arrow A. Arrow B in FIGS. 3 to 5 indicates the outward side of the approaching vehicle warning speaker device 100. The approaching vehicle warning speaker device 1 according to the first embodiment is mounted not only on a hybrid vehicle but may also be mounted in an electric vehicle.

A configuration of the approaching vehicle warning speaker device 100 will now be described. The approaching vehicle warning speaker device 100 includes a voice coil 101 conductive of electric signals, a sleeve-like voice coil bobbin 102 around which the voice coil is wound, an insulating sheet 103, a diaphragm 104 that generates sound, a cap 105, a damper 106, a tinsel wire 107, and an annular member 108.

The voice coil bobbin 102 and the cap 105 are made of aluminum. The cap 105 is joined to the diaphragm 104. The cap 105 may be joined to the edge of the voice coil bobbin 102 in the sound-emission side.

The voice coil bobbin and the cap made of aluminum offer preferable heat dissipating property and improved thermal resistance. Moreover, the reduced weight provides a high reproduced sound pressure.

The sheet 103 comprising aramid non-woven fabric is wrapped around the voice coil bobbin 102 further in the sound-emission side (further to the side indicated by arrow A) than the voice coil 101. The diaphragm 104 and the damper 106 are bonded to the sheet 103 in a manner encircling the sheet 103. The diaphragm 104 is provided further in the sound-emission side than the damper 106. The diaphragm 104 and the damper 106 may be bonded to the voice coil bobbin 102.

With the diaphragm 104 bonded to the sheet 103 in a manner encircling the sheet 103, the diaphragm 104 is more firmly bonded to the voice coil bobbin 102 made of aluminum than the diaphragm directly bonded to the voice coil bobbin 102. The environmental resistance of the approaching vehicle warning speaker device 100 is thus improved.

With the damper 106 bonded to the sheet 103 in a manner encircling the sheet 103, the damper 106 is more firmly bonded to the voice coil bobbin 102 made of aluminum than the damper 106 directly bonded to the voice coil bobbin 102. The environmental resistance of the approaching vehicle warning speaker device 100 is thus improved.

The voice coil 101 is made of a covered wire coated with polyamide-imide. The voice coil 101 thus provided offers improved thermal resistance. The covered wire is not necessarily coated with polyamide-imide but may be coated with polyimide.

The cap 105 is made thinner than the voice coil bobbin 102. In the first embodiment, the voice coil bobbin 102 is made of an aluminum plate having a thickness of 50 μm, and the cap 105 is made of an aluminum plate having a thickness of 30 μm. With such thicknesses provided, the approaching vehicle warning speaker device 100 can be made light in weight, thereby offering a high reproduced sound pressure.

Thicknesses of the voice coil bobbin 102 and the cap 105 are not respectively limited to 50 μm and 30 μm. The voice coil bobbin 102 may have a thickness of 50 μm to 80 μm, and the cap 105 may have a thickness of 30 μm to 50 μm.

Using standard aluminum plates having thicknesses of 30 μm, 50 μm, and 80 μm as materials of the voice coil bobbin 102 and the cap 105, for example, manufacturing cost can be reduced.

Figure 3:
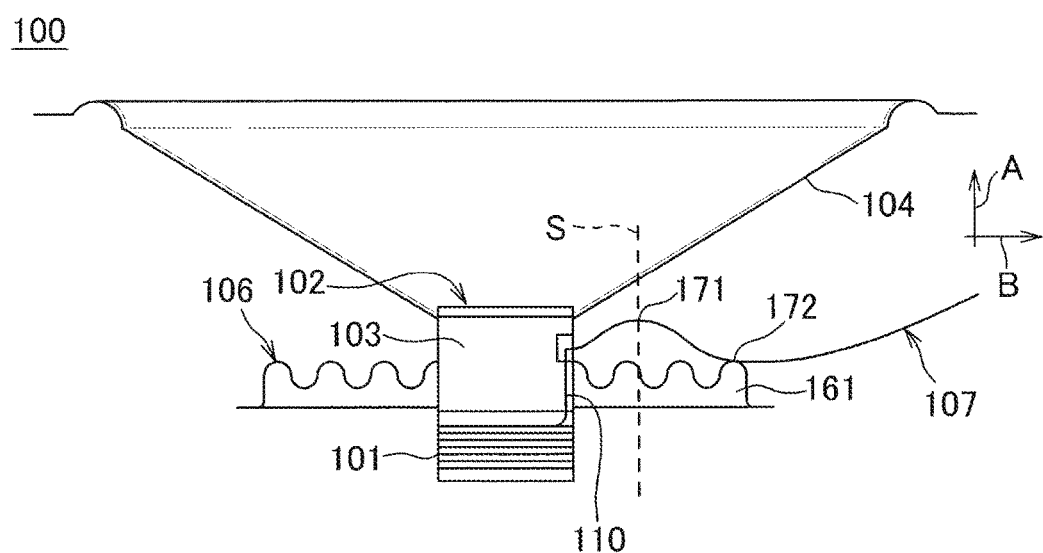
FIG. 3 is a schematic figure illustrating a sectional view of the approaching vehicle warning speaker device in FIG. 1 taken along line III-III.

As illustrated in FIG. 3, the tinsel wire 107 is joined to a lead wire 110 of the voice coil 101 and led out from the voice coil bobbin 102, at a location further in the sound-emission side than the damper 106, further in the sound-emission side (indicted by the arrow A) toward the outer edge 161 of the damper 106 (indicated by the arrow B). The tinsel wire 107 inflects at an inflection point 171 in the sound-emission side to be directed to the side opposite the sound-emission side and extends toward the direction opposite the sound-emission side toward the outer edge 161. The tinsel wire 107 is joined to the outer edge 161 of the damper 106 at a joint 172.

With such a configuration, the length of the portion of the tinsel wire 107 running above the damper 106 is reduced. This reduces the force acting on the tinsel wire 107 generated by vibration of the voice coil bobbin 102 and thus reduces the force acting on joints between the tinsel wire 107 and the voice coil bobbin 102. Therefore, the volume of reinforcement (e.g., modified polyamide) applied to the joint between the tinsel wire 107 and the voice coil 101 can be minimized or eliminated. The weight of the vibrating portion of the approaching vehicle warning speaker device 100 can thus be reduced.

The tinsel wire 107 is provided approximately line symmetric about the line extending from the inflection point 171 along the sound-emission direction (indicated by S in the figure).

With the tinsel wire 107 thus provided, the damage to the joint between the voice coil bobbin 102 and the tinsel wire 107 due to, for example, excessive load on the tinsel wire 107 caused by resonation of the tinsel wire 107 by vibration of the voice coil bobbin 102 is suppressed, and thus the environmental resistance is improved. An adhesive or the like may be applied to the tinsel wire 107 as required to enhance strength.

An adhesive bonds together the sheet 103 and the damper 106. For example, an adhesive containing one or more components selected from a group of acrylic resin, silicone resin, and epoxy resin can be used.

Figure 4:
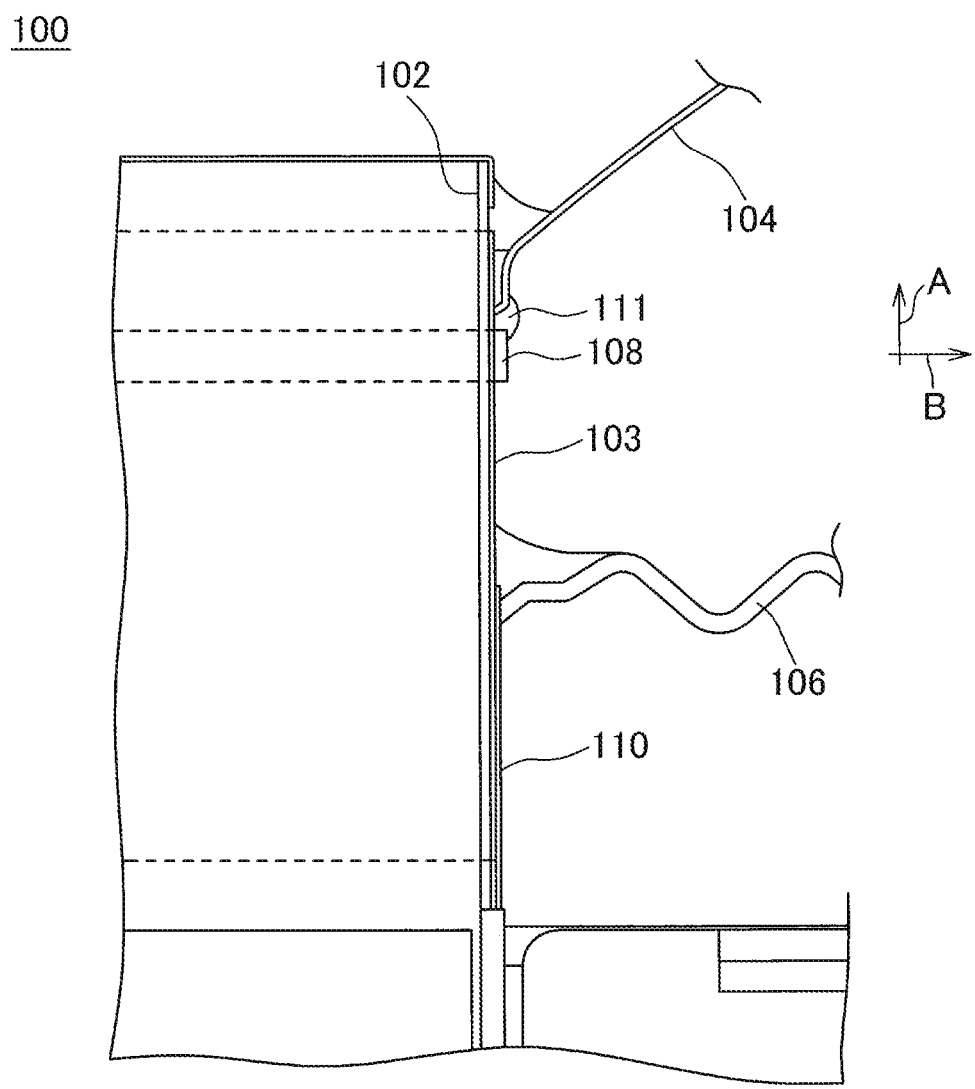
FIG. 4 is a schematic figure illustrating an essential portion of the approaching vehicle warning speaker device in FIG. 1 taken along the line III-III.

As illustrated in FIG. 4, an adhesive 111 is used to bond together the sheet 103 and the diaphragm 104. The annular member 108 is joined to the voice coil bobbin 102 at a location further in the side opposite the sound-emission side than the diaphragm 104 (that is, further in the side to the voice coil 101 and the damper 106). The annular member 108 according to the first embodiment is a paper strip that is wound a plurality of times around the voice coil bobbin 102. The thickness of the annular member 108 wound around the voice coil bobbin 102 is, for example, 0.4 to 0.6 mm.

The annular member 108 thus provided dams the adhesive for bonding the diaphragm 104, so that the adhesive will not spread beyond the area to be bonded. This allows only the required amount of adhesive for bonding the diaphragm 104 to be applied and thus reduces the amount of adhesive that is used. The weight of the vibrating portion of the approaching vehicle warning speaker device 100 can thus be reduced, thereby raising the reproduced sound pressure.

Second Embodiment

Figure 5:
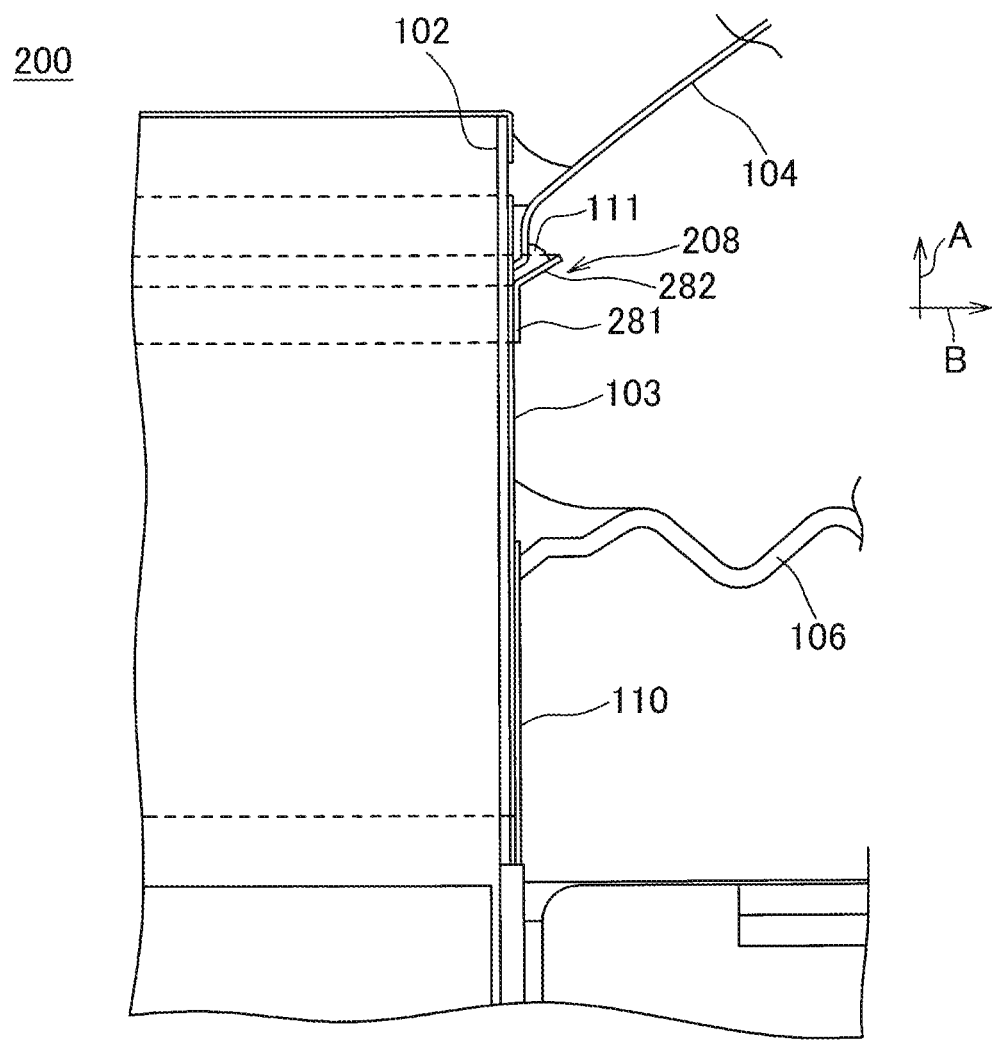
FIG. 5 is a schematic view of an essential portion of an approaching vehicle warning speaker device according to a second embodiment of the present invention.

An approaching vehicle warning speaker device 200 according to a second embodiment of the present invention will now be described with reference to FIG. 5. The approaching vehicle warning speaker device 200 has the same configuration as the approaching vehicle warning speaker device 100 according to the first embodiment except that the annular member 108 is replaced with an annular member 208.

The annular member 208 is a member made of paper. The annular member 208 includes an annular portion 281 provided on the circumference of the voice coil bobbin 102 and an angled portion 282 an edge of which continues from the sound-emission side edge of the annular portion 281. The angled portion 282 extends from the annular portion 281 in the sound-emission side (indicated by the arrow A) toward the outer edge 161 of the damper 106 (indicated by the arrow B). The other edge of the angled portion 282 is further in the sound-emission side than the edge of the diaphragm 104, which edge being in the side to the voice coil 101. The projecting distance of the annular member 208 from the voice coil bobbin 102 along the direction indicated by the arrow B may be, for example, 1 mm.

The angled portion 282 of the annular member 208 thus provided dams the adhesive 111 for bonding the diaphragm 104, so that the adhesive 111 will not spread further into the area to the voice coil 101. This allows only the required amount of adhesive for bonding the diaphragm 104 to be applied and thus further reduces the amount of adhesive that is used. The weight of the vibrating portion of the approaching vehicle warning speaker device 200 can thus be reduced, thereby raising the reproduced sound pressure.

The best mode, such as a configuration and a method, to carryout the present invention is not limited to those described above. Although description and illustration on the present invention are presented mainly for a particular embodiment, various modifications regarding the shape, material, the number of parts, and other structural details can be made for the embodiment by those skilled in the art without departing from the technical idea and the scope of the present invention.

Definitive descriptions used to describe shapes and materials are given by way of illustration to promote understanding of the present invention, not byway of limiting the scope of the present invention. Therefore, a component referred to as a name not including the above definitive description or a portion thereof falls within the scope of the present invention.

REFERENCE SIGNS LIST 100, 200 approaching vehicle warning speaker device
101 voice coil
102 voice coil bobbin
103 sheet
104 diaphragm
105 cap
106 damper
107 tinsel wire
108, 208 annular member
111 adhesive

The invention claimed is:

1. An approaching vehicle warning speaker device comprising:
   a voice coil conducting an electric signal;
   a sleeve-shaped voice coil bobbin around which the voice coil is wound;
   an insulating sheet wrapped around the voice coil bobbin at a location further in a sound-emission side than the voice coil;
   a cap provided further in the sound-emission side than the voice coil bobbin; and
   a diaphragm configured to generate sound,
   wherein the voice coil bobbin and the cap are made of material containing aluminum,
   the sheet is formed of non-woven fabric containing aramid,
   the sheet and the diaphragm are joined to one another with an adhesive, and
   an annular member is directly joined to the voice coil bobbin at a location further in a side opposite the sound-emission side than the diaphragm.

2. The approaching vehicle warning speaker device according to claim 1, wherein the voice coil is made of a covered wire coated with polyamide-imide or polyimide.

3. The approaching vehicle warning speaker device according to claim 1, wherein a thickness of the cap is equal to or smaller than a thickness of the voice coil bobbin.

4. The approaching vehicle warning speaker device according to claim 3, wherein the voice coil bobbin has a thickness of 50 μm to 80 μm.

5. The approaching vehicle warning speaker device according to claim 3, wherein the cap has a thickness of 30 μm to 50 μm.

6. The approaching vehicle warning speaker device according to claim 1, wherein a damper is bonded to the sheet in a manner encircling the sheet.

7. The approaching vehicle warning speaker device according to claim 6, wherein the voice coil is joined to a tinsel wire, the tinsel wire is led out from the voice coil bobbin, at a location further in the sound-emission side than the damper, further in the sound-emission side toward an outer edge of the damper, the tinsel wire inflecting at an inflection point in the sound-emission side to be directed to a side opposite the sound-emission side, and the tinsel wire is joined to the outer edge of the damper.

8. The approaching vehicle warning speaker device according to claim 7, wherein the tinsel wire is provided approximately line symmetric about a line extending from the inflection point along a sound-emission direction.

9. The approaching vehicle warning speaker device according to claim 6, wherein the sheet and the damper are joined to one another with an adhesive, and the adhesive contains one or more components selected from a group of acrylic resin, silicone resin, and epoxy resin.

10. The approaching vehicle warning speaker device according to claim 1, wherein the annular member is a paper strip that is wound a plurality of times around the voice coil bobbin.

11. The approaching vehicle warning speaker device according to claim 10, wherein a thickness of the annular member wound around the voice coil bobbin is 0.4 mm to 0.6 mm.

12. The approaching vehicle warning speaker device according to claim 1, wherein the annular member includes an annular portion provided on the circumference of the voice coil bobbin and an angled portion, an edge of the angled portion continuing from the sound-emission side edge of the annular portion.

13. The approaching vehicle warning speaker device according to claim 11, wherein a thickness of the annular portion in the annular member is 0.4 mm to 0.6 mm.

14. The approaching vehicle warning speaker device according to claim 1, wherein the annular member dams the adhesive for bonding the diaphragm so that the adhesive is retained within a bonding area at which the sheet is bonded to the diaphragm.

* * * * *